(12) United States Patent
Watanabe

(10) Patent No.: US 8,749,692 B2
(45) Date of Patent: *Jun. 10, 2014

(54) IMAGE PROCESSING APPARATUS THAT CORRECTS DETERIORATION OF IMAGE, IMAGE PICKUP APPARATUS, IMAGE PROCESSING METHOD, AND PROGRAM

(71) Applicant: Canon Kabushiki Kaisha, Tokyo (JP)

(72) Inventor: Takeshi Watanabe, Utsunomiya (JP)

(73) Assignee: Canon Kabushiki Kaisha (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/675,249

(22) Filed: Nov. 13, 2012

(65) Prior Publication Data

US 2013/0100309 A1    Apr. 25, 2013

Related U.S. Application Data

(63) Continuation of application No. 13/236,730, filed on Sep. 20, 2011.

(30) Foreign Application Priority Data

Sep. 28, 2010    (JP) ................................ 2010-216320

(51) Int. Cl.
*H04N 5/225* (2006.01)
*H04N 5/228* (2006.01)
*H04N 5/232* (2006.01)
*G06K 9/40* (2006.01)

(52) U.S. Cl.
USPC ........ 348/335; 348/222.1; 348/349; 382/254; 382/265

(58) Field of Classification Search
USPC ............ 348/335, 340, 222.1, 207.99, 231.99, 348/231.6; 382/254, 260–262, 265, 275
See application file for complete search history.

(56) References Cited

U.S. PATENT DOCUMENTS

| 6,628,329 | B1 * | 9/2003 | Kelly et al. | 348/252 |
| 7,228,005 | B1 * | 6/2007 | Yuan | 382/280 |
| 2005/0197809 | A1 * | 9/2005 | Dowski et al. | 703/6 |

(Continued)

FOREIGN PATENT DOCUMENTS

| JP | 09-006959 A | 1/1997 |
| JP | 10-200710 A | 7/1998 |
| JP | 2002-024816 A | 1/2002 |
| JP | 2010-056992 A | 3/2010 |

OTHER PUBLICATIONS

Japanese Office Action cited in Japanese counterpart application No. JP2012-223839, dated Sep. 17, 2013.

*Primary Examiner* — Nhan T Tran
*Assistant Examiner* — Chan Nguyen
(74) *Attorney, Agent, or Firm* — Rossi, Kimms & McDowell, LLP

(57) ABSTRACT

An image processing apparatus includes a data storing portion configured to store coefficient data for reconstructing an optical transfer function of an image pickup optical system in accordance with a type of the image pickup optical system and an imaging condition, a tap number determining portion configured to determine a tap number of the optical transfer function that is reconstructed by using the coefficient data in accordance with a size of one pixel of an image pickup element, and a reconstruction portion configured to reconstruct the optical transfer function in accordance with Nyquist frequency of the image pickup element and the tap number in a frequency space.

25 Claims, 13 Drawing Sheets

(56) References Cited

U.S. PATENT DOCUMENTS

| | | | |
|---|---|---|---|
| 2007/0236573 A1* | 10/2007 | Alon et al. | 348/207.99 |
| 2010/0079659 A1* | 4/2010 | Ono | 348/345 |
| 2010/0214438 A1* | 8/2010 | Hayashi et al. | 348/229.1 |
| 2012/0075502 A1 | 3/2012 | Watanabe | |

\* cited by examiner

IMAGE PROCESSING APPARATUS THAT CORRECTS DETERIORATION OF IMAGE, IMAGE PICKUP APPARATUS, IMAGE PROCESSING METHOD, AND PROGRAM

CROSS REFERENCE TO RELATED APPLICATION

This application is a continuation of prior U.S. patent application Ser. No. 13/236,730, filed Sep. 20, 2011, the entire disclosure of which is hereby incorporated herein by reference.

BACKGROUND OF THE INVENTION

1. Field of the Invention

The present invention relates to an image processing apparatus, and more particularly to an image processing apparatus that corrects deterioration of an image caused by an image pickup optical system at a high resolution and at a high level of quality.

2. Description of the Related Art

With respect to an object taken via an image pickup optical system, light emitted from one point cannot be focused to one point and has a small spread due to the influence of diffraction or aberration generated by the image pickup optical system. The distribution having such a small spread is called a point-spread function (PSF). Due to the influence of the image pickup optical system, a taken image is formed by convolving the PSF into an object image, and as a result the image is blurred and the resolution is deteriorated.

Recently, it has been common that the taken image is stored as electronic data, and a technology of correcting an image deterioration caused by an optical system using an image processing has been proposed. Japanese Patent Laid-Open No. 2010-56992 discloses a method of storing a filter coefficient for correcting the image deterioration to perform an image processing.

However, when the deterioration correction of the image is performed by a filter processing using an image restoration filter, it is necessary that information of an optical transfer function (OTF information) for making the image restoration filter are stored in an apparatus for each pixel. However, since the OTF information is calculated by each of the information of an image pickup element and the image pickup optical system, an amount of the information is significantly large and it is difficult to store all of them in the apparatus.

SUMMARY OF THE INVENTION

The present invention provides an image processing apparatus that reduces an amount of storage of data required for reconstructing an optical transfer function of an image pickup optical system.

An image processing apparatus as one aspect of the present invention includes a data storing portion configured to store coefficient data for reconstructing an optical transfer function of an image pickup optical system in accordance with a type of the image pickup optical system and an imaging condition, a tap number determining portion configured to determine a tap number of the optical transfer function that is reconstructed by using the coefficient data in accordance with a size of one pixel of an image pickup element, and a reconstruction portion configured to reconstruct the optical transfer function in accordance with Nyquist frequency of the image pickup element and the tap number in a frequency space.

An image pickup apparatus as another aspect of the present invention includes an image pickup element, a data storing portion configured to store coefficient data for reconstructing an optical transfer function of an image pickup optical system in accordance with a type of the image pickup optical system and an imaging condition, a tap number determining portion configured to determine a tap number of the optical transfer function that is reconstructed by using the coefficient data in accordance with a size of a point-spread function of each image height and a size of one pixel of an image pickup element, and a reconstruction portion configured to perform a sampling by the tap number up to Nyquist frequency of the image pickup element in a frequency space to reconstruct the optical transfer function.

An image processing method as another aspect of the present invention includes the steps of selecting coefficient data for reconstructing an optical transfer function of the image pickup optical system in accordance with a type of the image pickup optical system and an imaging condition, determining a tap number of the optical transfer function that is reconstructed by using the coefficient data in accordance with a size of a point-spread function of each image height and a size of one pixel of an image pickup element, reconstructing the optical transfer function by performing a sampling by the tap number up to Nyquist frequency of the image pickup element in a frequency space, making an image restoration filter for correcting an object image based on the reconstructed optical transfer function, and performing a filter processing for the object image on a real space using the image restoration filter.

A program as another aspect of the present invention is a program which is configured so that a computer executes the steps of selecting coefficient data for reconstructing an optical transfer function of the image pickup optical system in accordance with a type of the image pickup optical system and an imaging condition, determining a tap number of the optical transfer function that is reconstructed by using the coefficient data in accordance with a size of a point-spread function of each image height and a size of one pixel of an image pickup element, reconstructing the optical transfer function by performing a sampling by the tap number up to Nyquist frequency of the image pickup element in a frequency space, making an image restoration filter for correcting an object image based on the reconstructed optical transfer function, and performing a filter processing for the object image on a real space using the image restoration filter.

Further features and aspects of the present invention will become apparent from the following description of exemplary embodiments with reference to the attached drawings.

DESCRIPTION OF THE PREFERRED EMBODIMENTS

Figure 1:
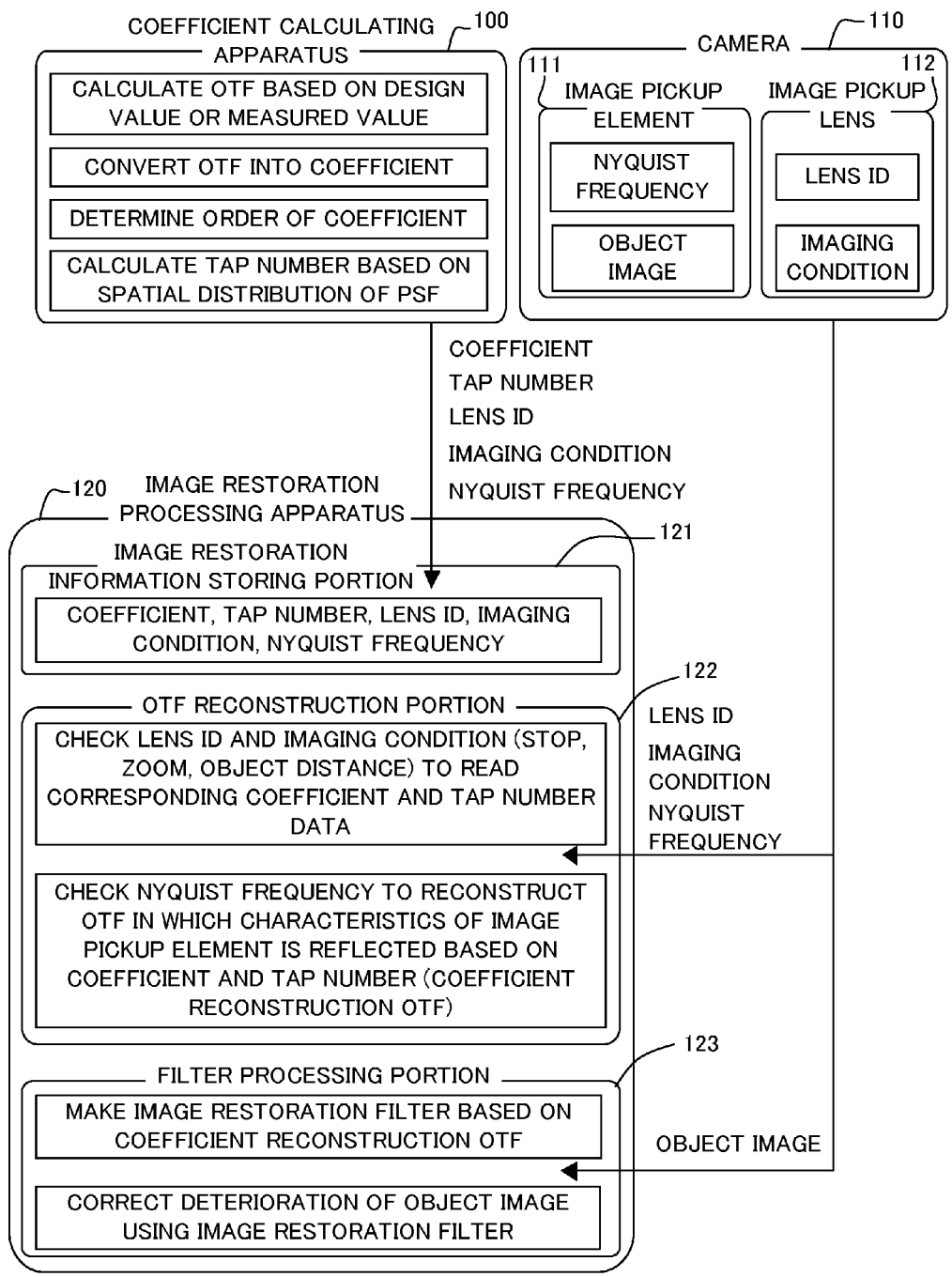
FIG. 1 is a configuration diagram of an image processing apparatus in Embodiment 1.

Exemplary embodiments of the present invention will be described below with reference to the accompanied drawings.

First of all, a method of performing a common image restoration processing will be described. When an image before receiving deterioration caused by an optical system is defined as $f(x, y)$, PSF (point-spread function) is defined as $h(x, y)$, and a deteriorated image is defined as $g(x, y)$ on a real space $(x, y)$, these are represented as following Expression (1).

$$g(x,y) = \iint f(X, Y) * h(x-X, y-Y) dX dY \quad (1)$$

In Expression (1), $f(x, y)$ denotes an image before receiving the deterioration, $g(x, y)$ denotes a deteriorated image, and $h(x, y)$ denotes the point-spread function (PSF). When the Fourier transform is performed for Expression (1) described above to convert the real space $(x, y)$ into a frequency space $(u, v)$, the relation represented by following Expression (2) is met.

$$G(u,v) = F(u,v) * H(u,v) \quad (2)$$

In Expression (2), $F(u, v)$, $G(u, v)$, and $H(u, v)$ denote the Fourier transforms of the $f(x, y)$, $g(x, y)$, and $h(x, y)$, respectively. Therefore, following Expression (3) is met.

$$F(u,v) = G(u,v)/H(u,v) \quad (3)$$

Expression (3) means that the Fourier transform $F(u, v)$ of the image before receiving the deterioration $f(x, y)$ is obtained when the Fourier transform $G(u, v)$ of the deteriorated image $g(x, y)$ is divided by the Fourier transform $H(u, v)$ of the point-spread function $h(x, y)$ on the frequency space. Accordingly, the image before receiving the deterioration $f(x, y)$ can be obtained by performing the inverse Fourier transform for $F(u, v)$.

However, if the image before receiving the deterioration is actually obtained by performing the processing, a noise generated by an image pickup element is amplified and therefore a good image cannot be obtained.

As an image restoration method of suppressing the amplitude of the noise, it is known that the Wiener filter represented by following Expression (4) is used.

$$1/H(u,v) * |H(u,v)|^2/(|H(u,v)|^2 + \Gamma) \quad (4)$$

In Expression (4), $H(u, v)$ denotes an optical transfer function (OTF), and $\Gamma$ denotes a constant which reduces an amplification amount of the noise.

When the Wiener filter represented by Expression (4) described above is multiplied by the OTF having the frequency and phase information of the image pickup optical system, a phase of the PSF generated by a diffraction or an aberration of an optical system is set to be zero and frequency characteristics are amplified to be able to obtain a high-resolution and high-quality image. In order to effectively use Expression (4), it is necessary to obtain accurate OTF information of the image pickup optical system. As a method of obtaining the OTF information, for example if there is design value information of the image pickup optical system, the OTF information can be obtained by the calculation based on the design value information. Alternatively, it can also be obtained by imaging a point light source to perform the Fourier transform for its intensity distribution. Generally, the optical performance, i.e. the F-number, the aberration, or the like, of the image pickup optical system used in a camera varies in accordance with an image height. Therefore, in order to correct the deterioration of an object image, the calculation on the frequency space cannot be collectively performed using Expression (4) in unchanged form, and therefore Expression (4) is converted into a filter on the real space every image height to perform the processing of correcting the deterioration.

An optical image that is formed by the image pickup optical system is electrically sampled by the image pickup element. Since the optical image that originally has a continuous quantity is converted into a discrete value, the optical image becomes a frequency signal having a cycle of a sampling frequency in the frequency space. Due to this cyclic property, when the frequency signal is distributed beyond one-half of the sampling frequency, the frequency signal is overlapped and an accurate signal cannot be reproducible. The value of one-half of the sampling frequency is referred to as Nyquist frequency. The Nyquist frequency is represented by $fn = 1/(2*b)$, where b is a size of one pixel (a pixel pitch) of the image pickup element.

The spatial frequency characteristics of the optical image immediately before the image pickup element are represented by the OTF of the image pickup optical system. When the image restoration processing is performed, a size of one tap of the image restoration filter needs to be equal to a size of the image pickup element and preferably aperture characteristics of the image pickup element are also reflected. The former corresponds to performing the cutout of the OTF by the spatial frequency in which the Nyquist frequency of the image pickup element is the maximum value, and the latter corresponds to applying a low-pass filter to the OTF by the image pickup element. Therefore, the OTF information used for making the image restoration filter is not uniquely determined only by the image pickup optical system, and it also depends on the image pickup element.

Embodiment 1

First of all, an image processing apparatus in Embodiment 1 of the present invention will be described. FIG. 1 is a configuration diagram of the image processing apparatus as one example in the present embodiment. The image processing apparatus of the present embodiment has a function of correcting a deteriorated image, and it is for example configured as a program (software) which is configured so that a computer executes the following image processing method.

In FIG. 1, the image processing apparatus includes a coefficient calculating apparatus 100 (a coefficient calculating portion) that calculates a coefficient for reconstructing an optical transfer function (hereinafter, referred to also as an "OTF"). The coefficient calculating apparatus 100 calculates the OTF based on a design value or a measured value of the image pickup optical system (an image pickup lens 112). The coefficient calculating apparatus 100 (an order determining portion) converts the OTF into the coefficient (coefficient data), and determines an order of the coefficient which is subsequently used for the reconstruction of the OTF in accordance with its accuracy (the accuracy of the fitting processing). Furthermore, the coefficient calculating apparatus 100 determines the tap number required in reproducing the OTF subsequently based on a size of the spatial distribution of the point-spread function (hereinafter, referred to also as a "PSF"). The coefficient calculating apparatus 100 calculates the coefficients up to the determined order and the tap number of the OTF with respect to the combination of various types of the image pickup optical systems (the image pickup lenses 112) and the image pickup element 111 to output them to an image restoration processing apparatus 120.

A camera 110 includes the image pickup element 111 and the image pickup lens 112. The camera 110 adds an ID number (a lens ID) that specifies the image pickup lens 112, an imaging condition such as a stop, a zoom, or an object distance, and a value of the Nyquist frequency of the spatial frequency which can be expressed by the image pickup element 111 to the object image which has been taken by the image pickup lens 112 to be outputted.

The image restoration processing apparatus 120 stores various types of information outputted from the coefficient calculating apparatus 100 and the camera 110, and corrects the object image (the deteriorated image) obtained via the image pickup lens 112 using the information. Hereinafter, an internal configuration of the image restoration processing apparatus 120 will be described in detail. An image restoration information storing portion 121 stores the coefficient (the coefficient data), the tap number, the lens ID, the imaging condition, and the Nyquist frequency to store them with respect to each of the combinations of the various types of image pickup lens 112 and the image pickup element 111 calculated by the coefficient calculating apparatus 100. Thus, the image restoration information storing portion 121 is a data storing portion that stores the coefficient data for reconstructing the OTF of the image pickup lens 112 or the like in accordance with the type of the image pickup lens 112, the imaging condition, and the like.

An OTF reconstruction portion 122 (a reconstruction portion) obtains the lens ID of the image pickup lens 112, the imaging condition, and the Nyquist frequency of the image pickup element 111 from the camera 110. The OTF reconstruction portion 122 also selects specific coefficient and tap number of the coefficients and the tap numbers which are stored in the image restoration information storing portion 121 based on the lens ID of the camera 110 used for taking the object image by a user and the imaging condition. Thus, the OTF reconstruction portion 122 is a tap number determining portion that determines the tap number of the OTF reconstructed using the coefficient in accordance with a size of the PSF of each image height and a size of one pixel of the image pickup element 111. Even when the tap number is not determined in accordance with the size of the PSF of each image height, the effect of the present embodiment can be obtained by having a coefficient for which a fitting by a function has been performed. It is preferred that the tap number be determined in accordance with the size of the PSF of each image height since an extra value does not need to be included.

Furthermore, the OTF reconstruction portion 122 performs the sampling frequencies up to the Nyquist frequency of the image pickup element 111 in the frequency space to reconstruct the OTF used in a filter processing portion 123 using the selected coefficient and tap number. Thus, the OTF reconstruction portion 122 reconstructs the OTF in accordance with the Nyquist frequency of the image pickup element 111 and the tap number. Hereinafter, the OTF made by the OTF reconstruction portion 122 is also referred to as a reconstruction OTF. The filter processing portion 123 makes an image restoration filter for correcting the deterioration of the taken object image using the reconstruction OTF made by the OTF reconstruction portion 122. Then, the filter processing is performed for the object image on the real space using the image restoration filter to correct the object image.

Next, a coefficient calculating method in the present embodiment will be described in detail. In the present embodiment, the OTF (the design value or the measured value) of the image pickup optical system (the image pickup lens 112) is approximated by performing the fitting processing to a predetermined function to make the coefficient. As a function used in the fitting processing, Legendre polynomial is used in the present embodiment. However, the present embodiment is not limited to this, and for example other expressions such as Chebushev polynomial may also be used. The Legendre polynomial is represented as following Expression (5). In Expression (5), [x] denotes the maximum integer which is not more than x.

$$P_n(x) = \frac{1}{2^n} \sum_{K=0}^{\left[\frac{n}{2}\right]} (-1)^k \frac{(2n-2k)!}{k!(n-k)!(n-2k)!} x^{n-2k} \tag{5}$$

Since the OTF is represented by a form of z=f(x, y), a coefficient in following Expression (6) needs to be calculated in the present embodiment.

$$z = \sum_i^{i=m} \sum_j^{j=n} a_{i,j} P(x)_i P(y)_j \tag{6}$$

Expression (6) described above is an orthogonal function, and the value of the coefficient is determined independently of the order in the fitting processing. Thus, since the OTF of the image pickup optical system is approximated by the fitting processing to the predetermined function to make the coefficient, an amount of storage of necessary data can be reduced. Using the characteristics of the orthogonal function represented by Expression (6), if the fitting processing of the OTF can be performed with sufficiently high accuracy only by using a low order, the processing can be terminated at this order and an amount of information of the coefficient that is to be stored in the apparatus can be suppressed.

Figure 2:
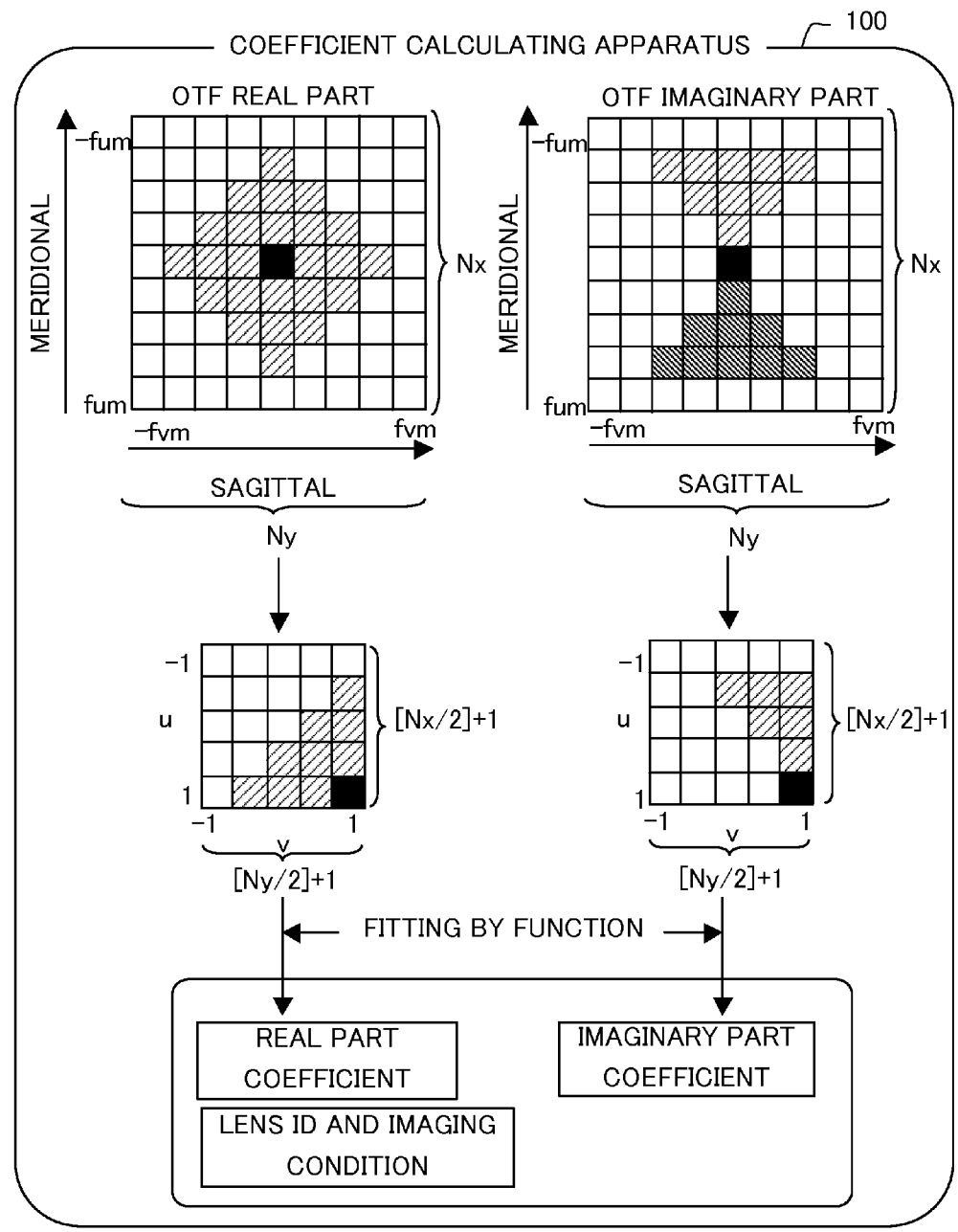
FIG. 2 is a diagram illustrating a coefficient calculating method that is performed by a coefficient calculating apparatus in Embodiment 1.

FIG. 2 is a diagram illustrating a coefficient calculating method that is performed by the coefficient calculating apparatus 100, and illustrates a specific method of performing the fitting processing of the optical transfer function (OTF) using Expressions (5) and (6) described above. In FIG. 2, reference signs fum and fvm are Nyquist frequencies in meridional and sagittal directions of the OTF, respectively. Reference signs Nx and Ny are odd tap numbers in the meridional and sagittal directions of the OTF, respectively. The coefficient calculating apparatus 100 calculates the coefficient for each of the real part and imaginary part of the OTF by performing the fitting processing.

The real part of the OTF is symmetrical in both the meridional direction and the sagittal direction. The imaginary part of the OTF is inversely symmetrical in the meridional direction, and it is symmetrical in the sagittal direction. Due to the symmetry, data of the OTF for which the fitting are to be performed are sufficient if there are information of areas having the symmetry such as at least ¼ area of whole of a defined area. In the present embodiment, for the reason above, the ¼ area of whole of the defined area for both the real part and the imaginary part is cut out so as to contain a DC component to perform the fitting processing of the OTF with high accuracy. The present embodiment indicates an example of a case in which the OTF data are Nx (row)×Ny (column) taps, and data of 1 to [Nx/2]+1 rows and 1 to [Ny/2]+1 columns are cut out, but the present embodiment is not limited to this.

Figure 3:
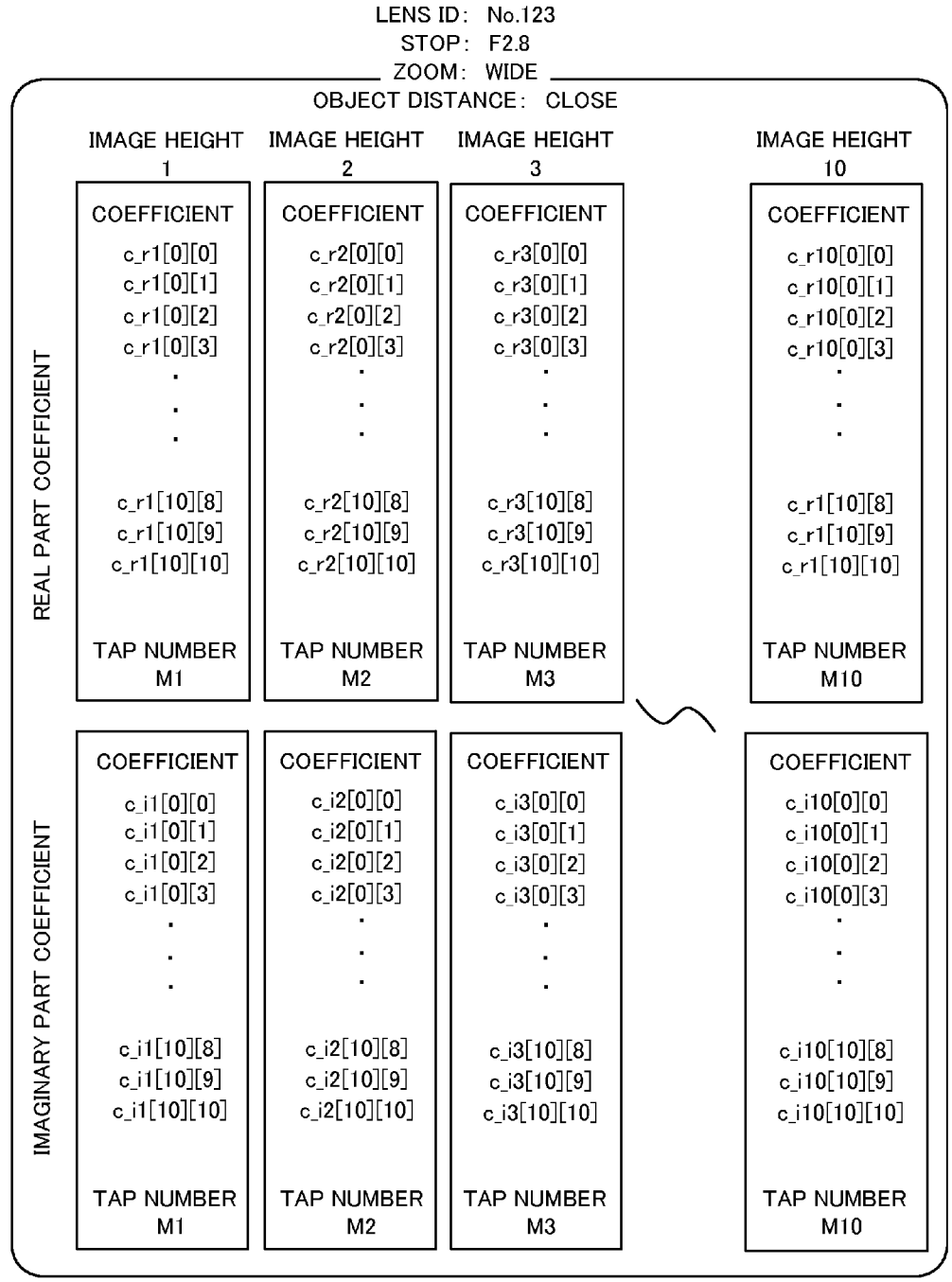
FIG. 3 is a diagram illustrating output data of the coefficient calculating apparatus in Embodiment 1.

FIG. 3 is one example of the output data of the coefficient calculating apparatus 100, and illustrates the coefficients calculated by the coefficient calculating method described above. As illustrated in FIG. 3, in the present embodiment, the coefficients of the real part and the imaginary part of the OTF are calculated up to 10th order for both x and y each image height (image heights 1 to 10). The coefficients for each image height are collected and further the information of the lens ID, the stop, and the zoom, and the object distance are added to complete one coefficient data. In the present embodiment, as one example, coefficients for 10 image heights on conditions that the lens ID is "No. 123", the stop is "F2.8", the zoom is "WIDE", and the object distance is "close range" are illustrated. The coefficients made as illustrated in FIG. 3 may also be defined as a function for each order and each image height. The coefficient calculating apparatus 100 makes the information for all the combinations of the lens ID, the stop, the zoom, and the object distance to be outputted.

Subsequently, a method of determining the tap number of the reconstruction OTF in the present embodiment will be described in detail. When the filter processing is performed for an image, the processing time significantly depends on the tap number of the filter. Therefore, it is preferred that the tap number of the filter be small if a desired effect of correcting the image deterioration is obtained and any negative effect such as ringing does not occur during the filter processing.

The image restoration filter used for correcting the deteriorated image is a filter on the real space. Accordingly, the tap number required for the filter on the real space may be determined. Since the image restoration filter is a filter that corrects the deterioration of the image caused by the point-spread function (PSF), an area similar to an area where the PSF is distributed on the real space only has to be ensured. In other words, the tap number required for the image restoration filter is the tap number of the PSF distribution area in the real space. Since the real space and the frequency space have the relationship of the inverse each other, the tap number determined in the real space can be used in the frequency space.

Figure 4:
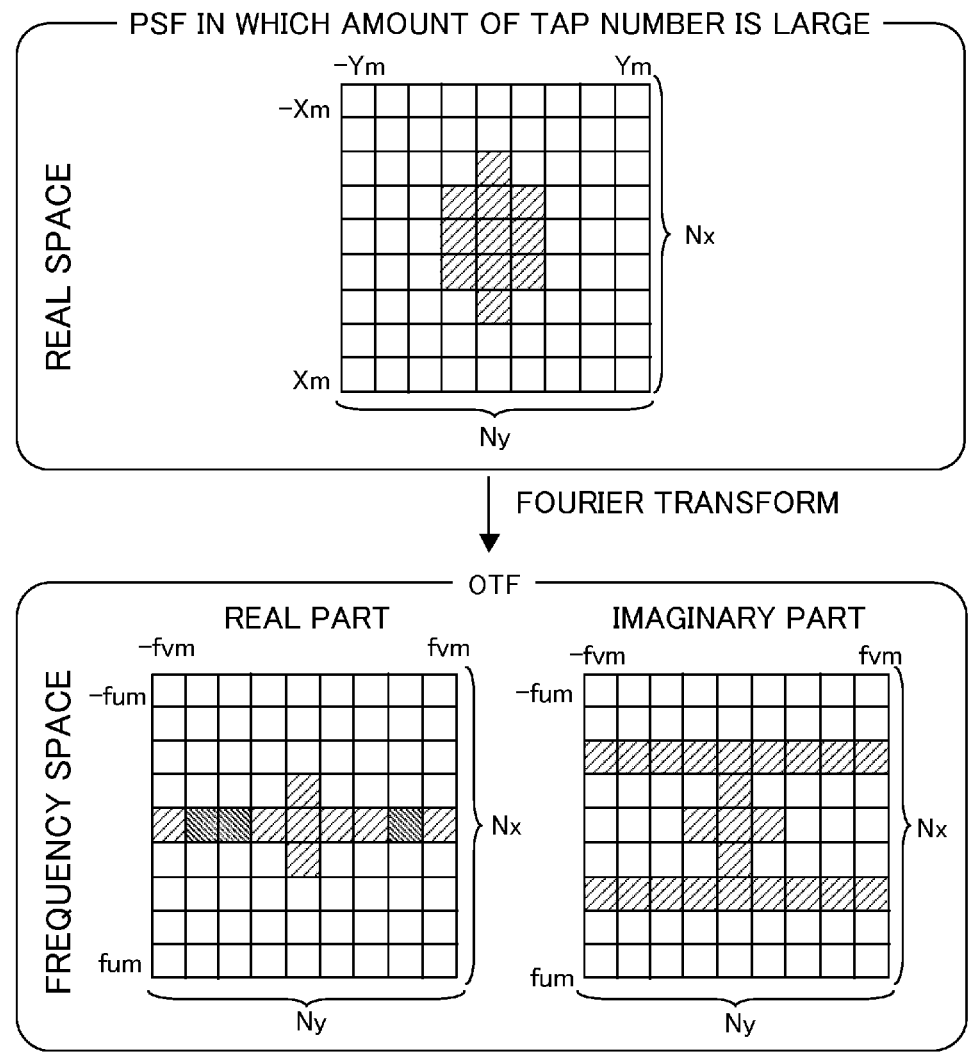
FIG. 4 is a diagram illustrating a relationship between PSF and the tap number in Embodiment 1 (when the tap number is large).
Figure 5:
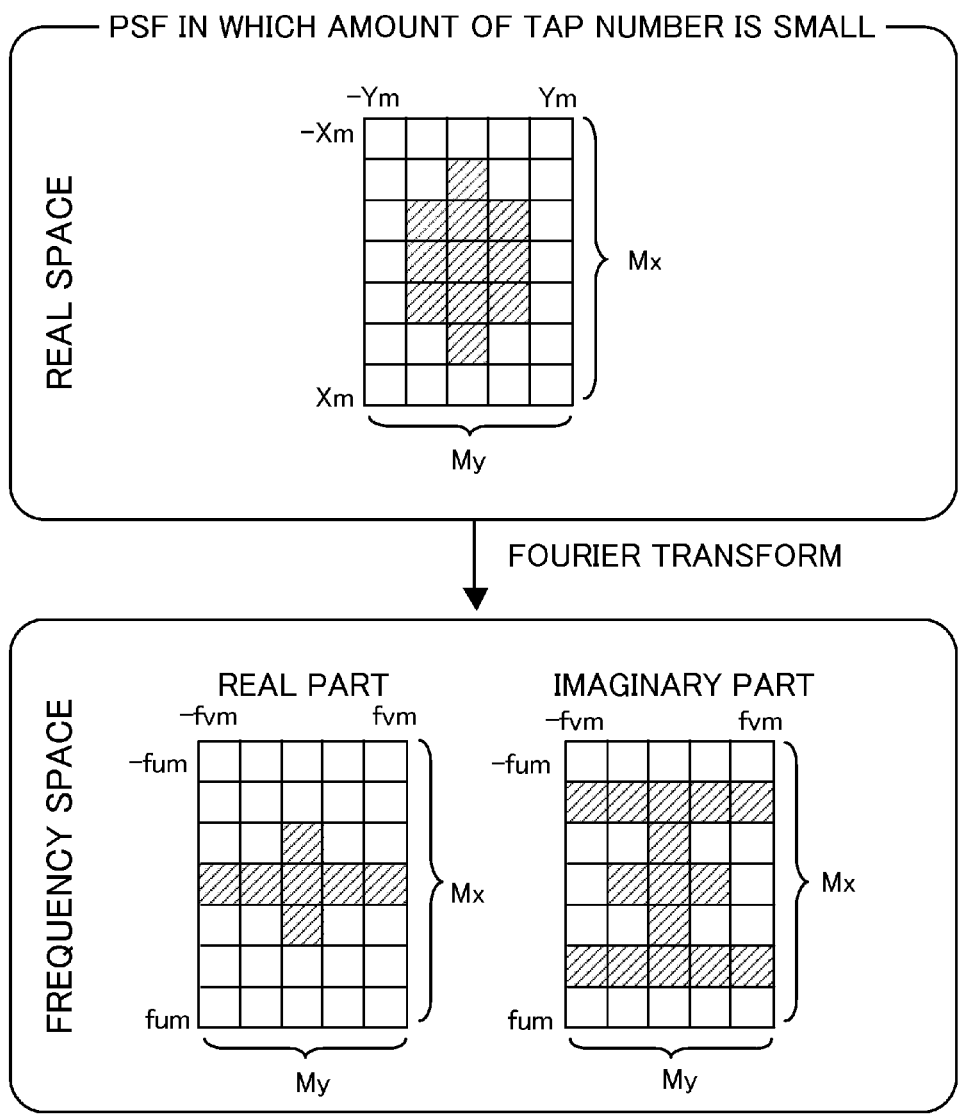
FIG. 5 is a diagram illustrating a relationship between the PSF and the tap number in Embodiment 1 (when the tap number is small).

Referring to FIGS. 4 and 5, this will be described in detail. FIG. 4 illustrates a case in which the tap number is applied to a sufficiently large area compared to the spatial distribution of the PSF. FIG. 5 illustrates a case in which the tap number is applied to an area substantially the same as the spatial distribution of the PSF for the same PSF as that of FIG. 4. In FIG. 4, the tap number in the real space corresponds to the minimum frequency pitch in the frequency space. On the other hand, reducing the tap number in the real space as illustrated in FIG. 5 means that the frequency space is roughly sampled, and indicates that the minimum frequency pitch is enlarged. In this case, the value of the Nyquist frequency in the frequency space does not change. Therefore, when the tap number is reduced to cut the spatial distribution of the PSF in the real space, the negative effect such as ringing described above is easily generated during the image restoration processing. Accordingly, it is preferred that the tap number of the filter be determined to be substantially the same area size as the spatial distribution of the PSF.

The image restoration information storing portion 121 stores the coefficient (the coefficient data), the tap number, the lens ID, the imaging condition, and the Nyquist frequency outputted from the coefficient calculating apparatus 100. The OTF reconstruction portion 122 obtains the lens ID, the imaging condition, and the Nyquist frequency from the camera 110. Subsequently, the OTF reconstruction portion 122 reads information of the selected tap number, lens ID, imaging condition, and Nyquist frequency from the image restoration information storing portion 121 to make the reconstruction OTF used for making the image restoration filter using the information.

Figure 6:
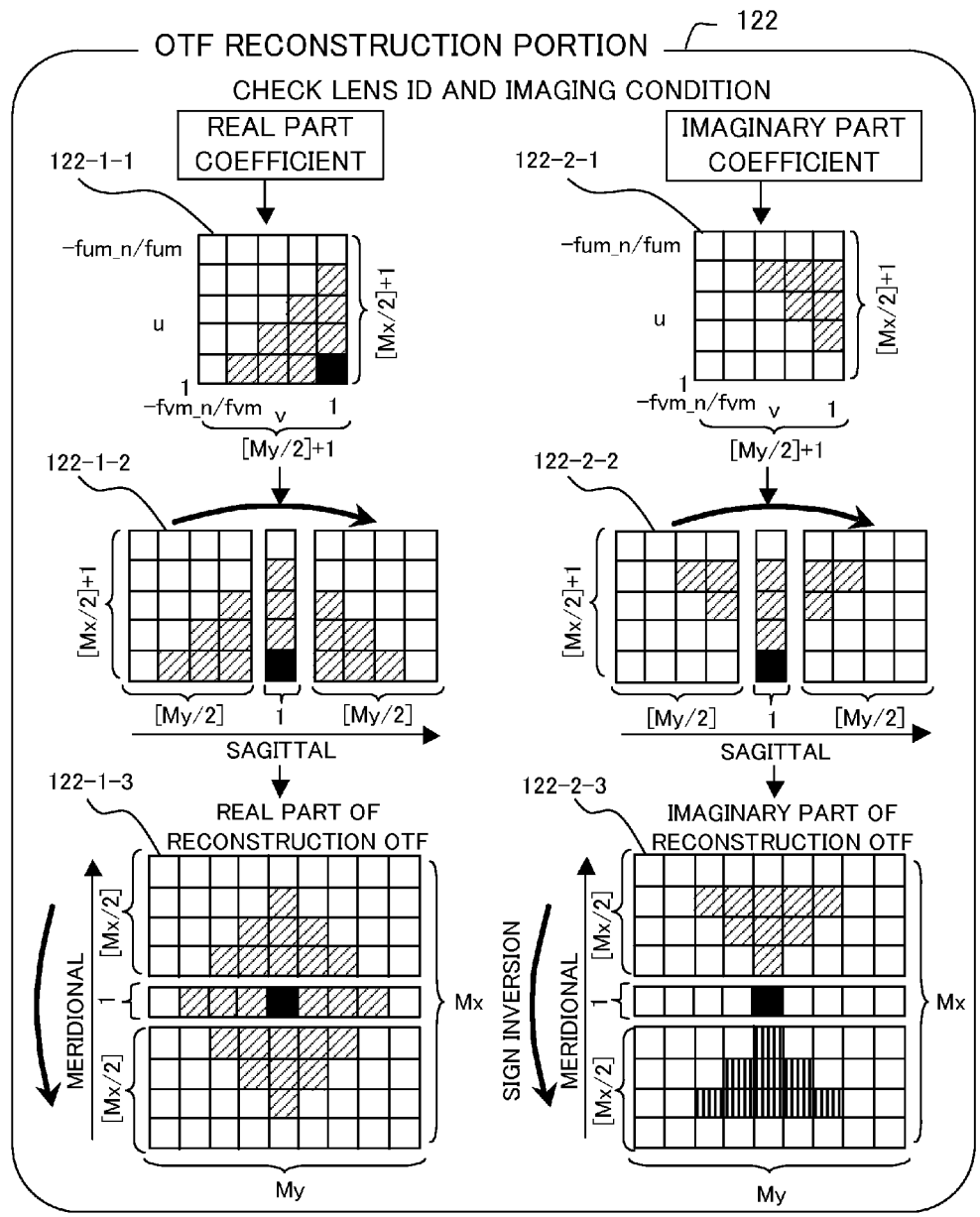
FIG. 6 is a diagram illustrating a method of making a reconstruction OTF by an OTF reconstruction portion in Embodiment 1.

Next, referring to FIG. 6, a method of making the reconstruction OTF by the OTF reconstruction portion 122 will be described in detail. The Nyquist frequencies in the meridional and sagittal directions required for making the reconstruction OTF are defined as fuc_rm and fvc_im, respectively. The tap numbers in the meridional and sagittal directions are defined as Mx and My, respectively. In the embodiment, with respect to the Nyquist frequencies fum and fvm, $0<\text{fum\_n}\le\text{fum}$, $0<\text{fvm\_n}\le\text{fvm}$, $0<Mx\le Nx$, and $0<My\le Ny$ are met, where the tap numbers Mx and My are odd numbers.

Furthermore, x and y in Expressions (1) and (2) described above are replaced with u and v, respectively, and areas of $-\text{fum\_n/fum}\le u\le 1$ and $-\text{fvm\_n/fvm}\le v\le 1$ are sampled by [Mx/2]+1 and [My/2]+1 taps, respectively. When the coefficient is substituted into Expression (2), the ¼ area (the quarter area) of the reconstruction OTF is made. The procedure is similarly performed for both the real part (122-1-1) and the imaginary part (122-2-1) of the reconstruction OTF. In the present embodiment, a method of making the reconstruction OTF which has the defined area (domain) of $-\text{fum\_n/fum}\le u\le\text{fum\_n/fum}$ and $-\text{fvm\_n/fvm}\le v\le\text{fvm\_n/fvm}$ and the tap numbers Mx and My based on the reconstruction OTF of the ¼ area of whole of the defined area for both the real part and the imaginary part will be described.

First of all, a method of making the real part of the reconstruction OTF will be described. Using the real part (122-1-1) of the reconstruction OTF, the area is divided into an area of 1 to [Mx/2]+1 rows and 1 to [My/2] columns and an area of 1 to [Mx/2]+1 rows and [My/2]+1 column. Subsequently, numerical data of the area of 1 to [Mx/2]+1 rows and 1 to [My/2] columns are substituted into an area of 1 to [Mx/2]+1 rows and [My/2]+2 to My columns (the real part (122-1-2)) so as to be axisymmetric with respect to the area of 1 to [Mx/2]+1 rows and [My/2]+1 column.

Furthermore, the reconstruction OTF of the ½ area (half area) made by the real part (122-1-2) is divided into an area of 1 to [Mx/2] rows and 1 to My columns and an area of [Mx/2]+1 row and 1 to My columns (the real part (122-1-3)). The numerical data of the area of 1 to [Mx/2] rows and 1 to My columns are substituted into the area of [Mx/2]+2 row and 1 to My columns so as to be axisymmetric with respect to the area of [Mx/2]+1 row and 1 to My columns.

Next, a method of making the imaginary part of the reconstruction OTF will be described. The imaginary part (122-2-2) can be made by a method similar to the real part (122-1-2). With respect to the imaginary part (122-2-3), the data need to be substituted by replacing positive and negative signs. The method of making the imaginary part as described above is possible because of the characteristics of the OTF.

Figure 7:
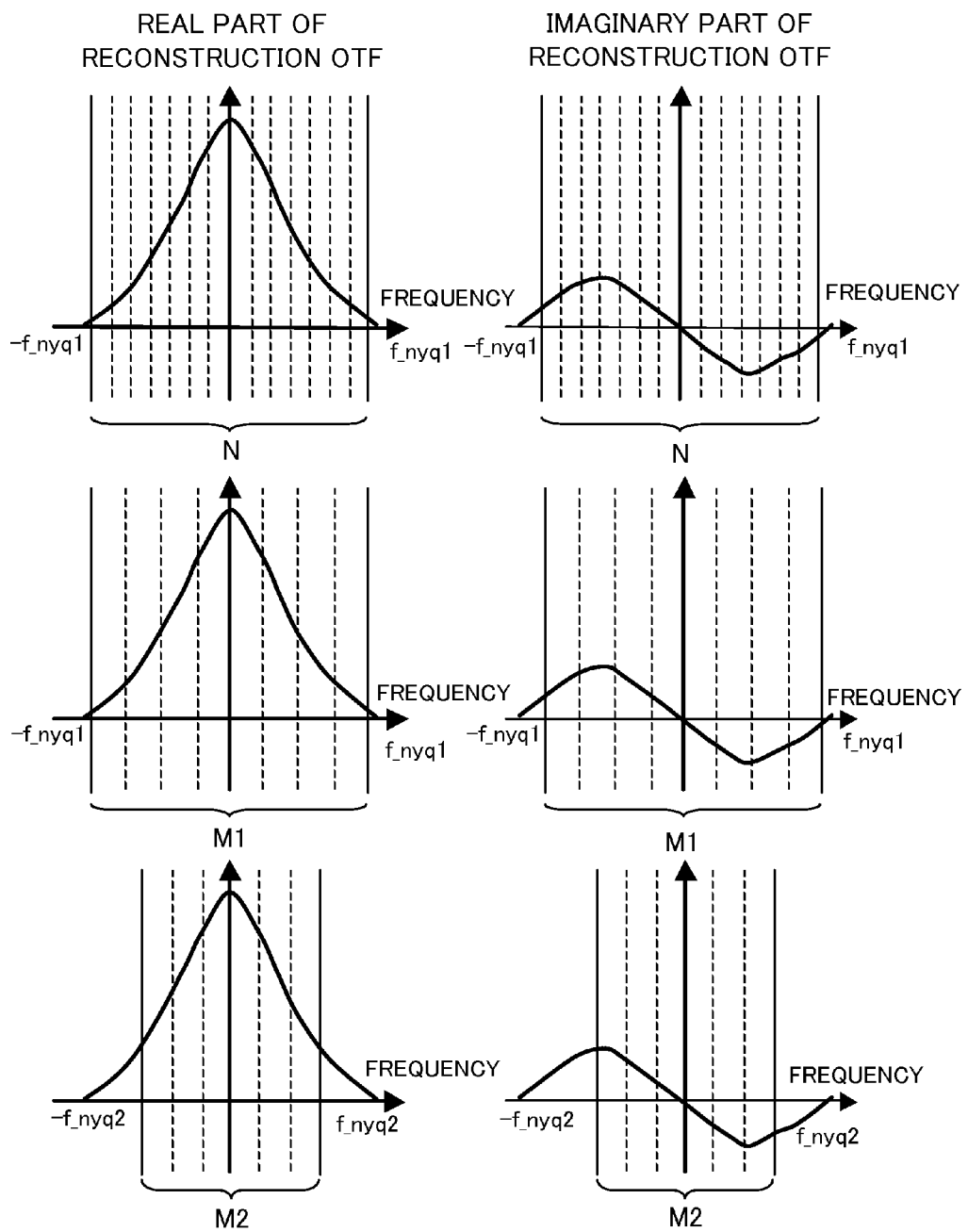
FIG. 7 is a diagram illustrating reconstruction OTF parameters of the OTF reconstruction portion in Embodiment 1.

FIG. 7 illustrates a reconstruction OTF parameter of the OTF reconstruction portion 122, and is a relation diagram of the Nyquist frequency and the tap number of the reconstruction OTF (a cross-sectional view of the reconstruction OTF). As described above, the Nyquist frequency is a parameter which depends on a camera body (the camera 110) determined based on the spatial resolution of the image pickup element 111. The tap number is a parameter which depends on the PSF of the image pickup lens 112. Based on these two parameters and the coefficient described above, a desired reconstruction OTF is made. In FIG. 7, with respect to the Nyquist frequency, f_nyq1>f_nyq2 is met, and with respect to the tap number, N>M1>M2 is met. In the present embodiment, as illustrated in FIG. 7, the Nyquist frequency and the tap number can be controlled so as to be desired values.

Figure 8A:
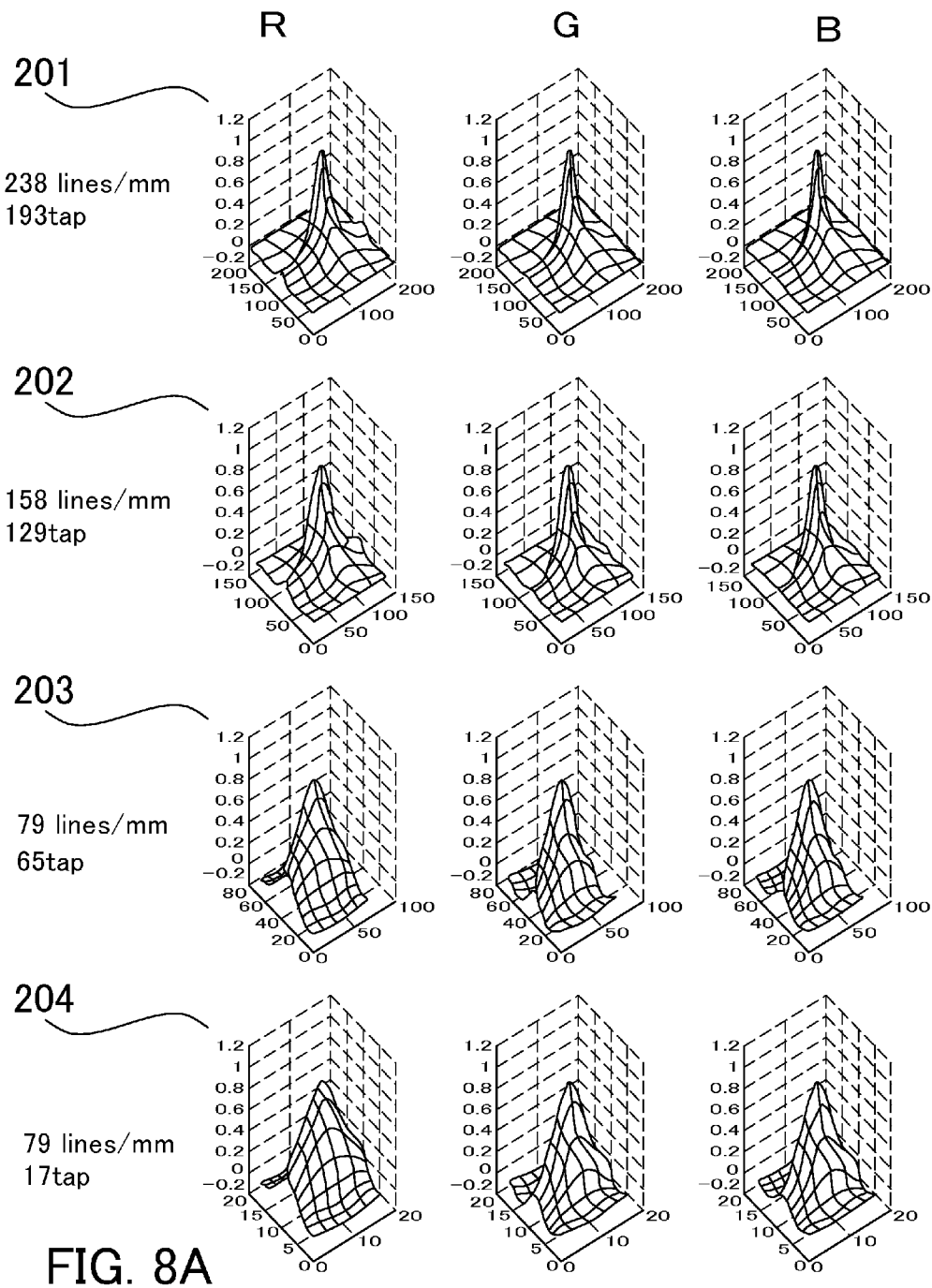
FIG. 8A is a diagram illustrating reconstruction OTF data of the OTF reconstruction portion in Embodiment 1.
Figure 8B:
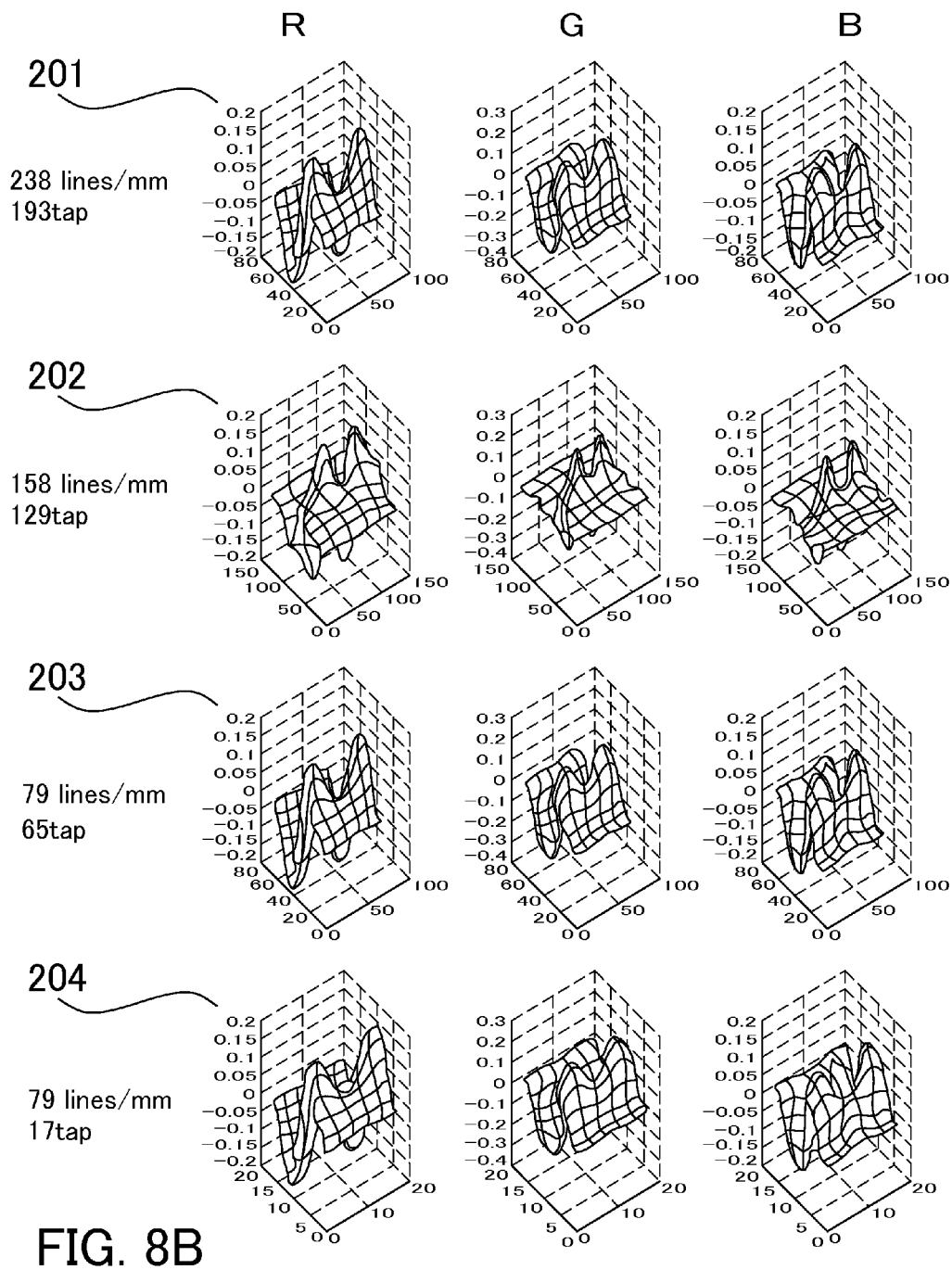
FIG. 8B is a diagram illustrating reconstruction OTF data of the OTF reconstruction portion in Embodiment 1.

One example of a case in which the image processing for correcting the deterioration of an object image has been performed by the above method will be described below. FIG. 8A illustrates the real part of the reconstruction OTF data of the OTF reconstruction portion 122, and FIG. 8B illustrates the imaginary part of the reconstruction OTF data. In FIGS. 8A and 8B, reference numeral 201 denotes a reconstruction OTF which is made based on 10th order coefficient of the Legendre polynomial using the OTF calculated from the design value information of the image pickup optical system on condition that the Nyquist frequency is 238 lines/mm and that the tap number is 193 on each side. Reference numerals 202 and 203 denote reconstruction OTF which are obtained when the tap number is only changed without changing the Nyquist frequency. Reference numeral 204 denotes a reconstruction OTF when the Nyquist frequency and the tap number are changed at the same time. Thus, in the present embodiment, the Nyquist frequency and the tap number can be controlled. Therefore, even when the combination of the image pickup lens 112 and the camera body is changed, the present embodiment can be applied without increasing stored data.

Figure 9:
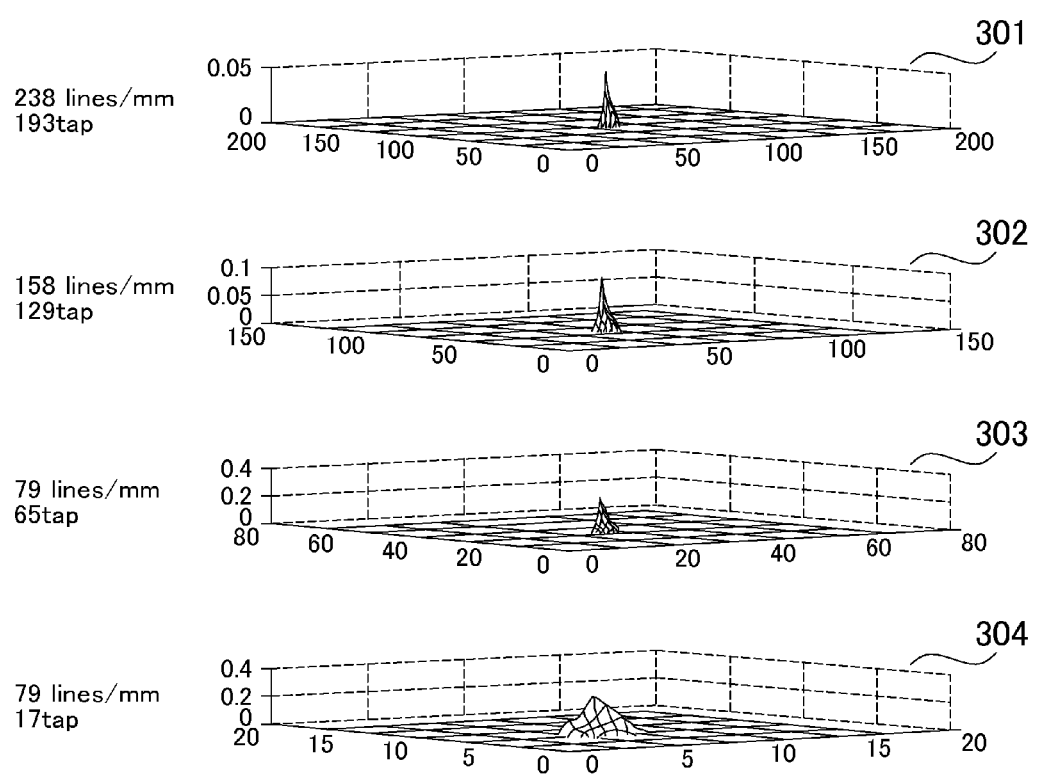
FIG. 9 is a diagram illustrating the tap number and PSF data in Embodiment 1.

FIG. 9 is a diagram illustrating a relationship between the tap number and the PSF data in the present embodiment. FIG. 9 illustrates the PSF corresponding to FIGS. 8A and 8B, and the Nyquist frequency and the tap number change corresponding to FIGS. 8A and 8B. Since the tap number does not cut out the spatial distribution of the PSF, a desired effect can be obtained by a subsequent deterioration correction of the object image using the image restoration filter.

Figure 10:
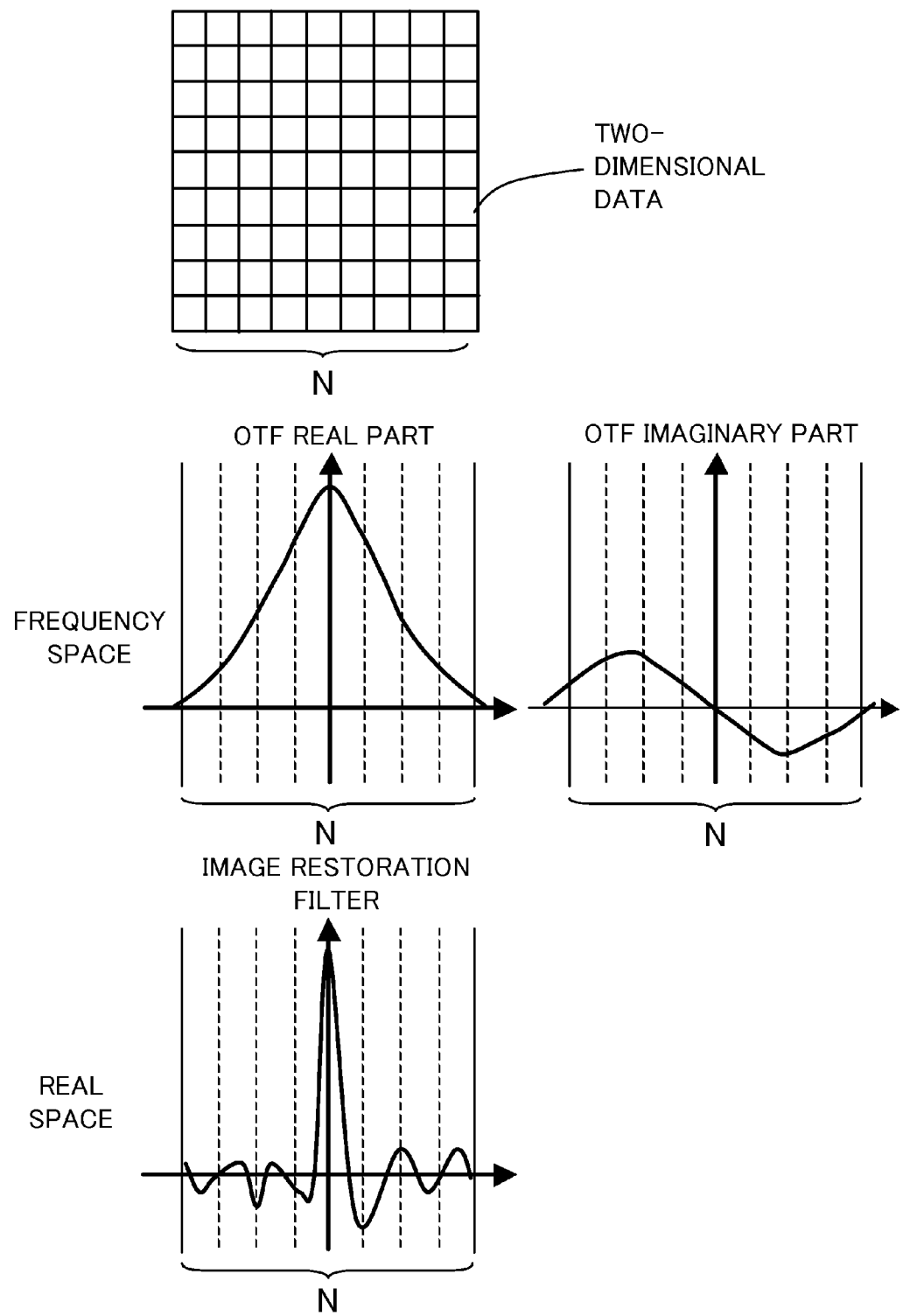
FIG. 10 is a conceptual diagram of an image restoration filter in Embodiment 1.
Figure 11:
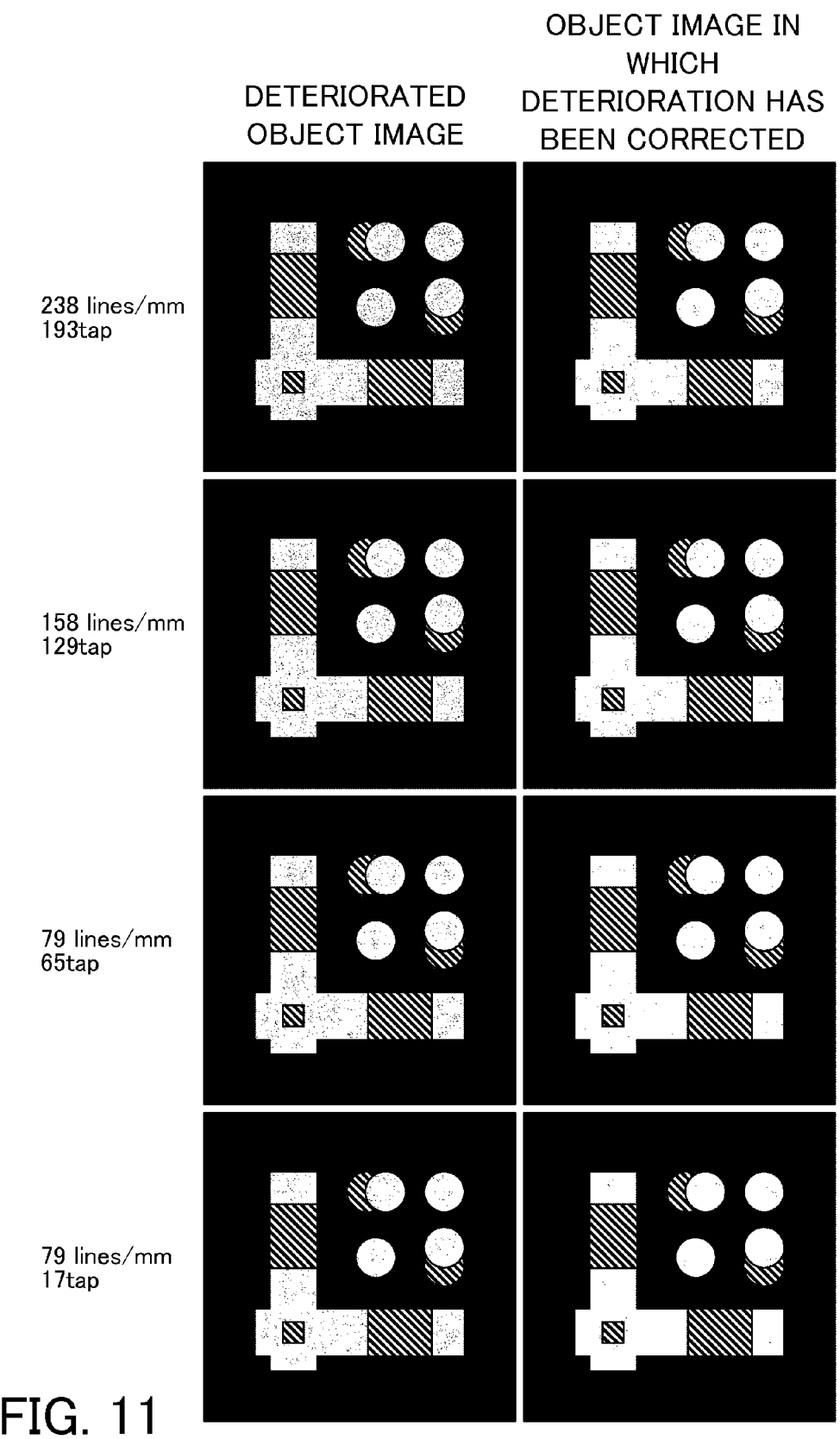
FIG. 11 is a diagram illustrating an object image corrected by the image restoration filter in Embodiment 1.

FIG. 10 is a conceptual diagram of the image restoration filter in the present embodiment. The image restoration filter is two-dimensional data of the real space having a form illustrated in the upper part of FIG. 10, and the tap number of the data is equal to the tap number of the OTF that is information on the spatial frequency. FIG. 11 illustrates object images corrected by the image restoration filter. FIG. 11 is one example of the object images corrected by the image restoration filter made from the coefficient reconstruction OTF illustrated in FIGS. 8A and 8B. As can be seen from FIG. 11, the object images deteriorated by the image pickup lens 112 are corrected with high resolution and with high quality.

According to the present embodiment, an image processing apparatus that reduces an amount of storage of data required for reconstructing an optical transfer function of an image pickup optical system can be provided.

Embodiment 2

Figure 12:
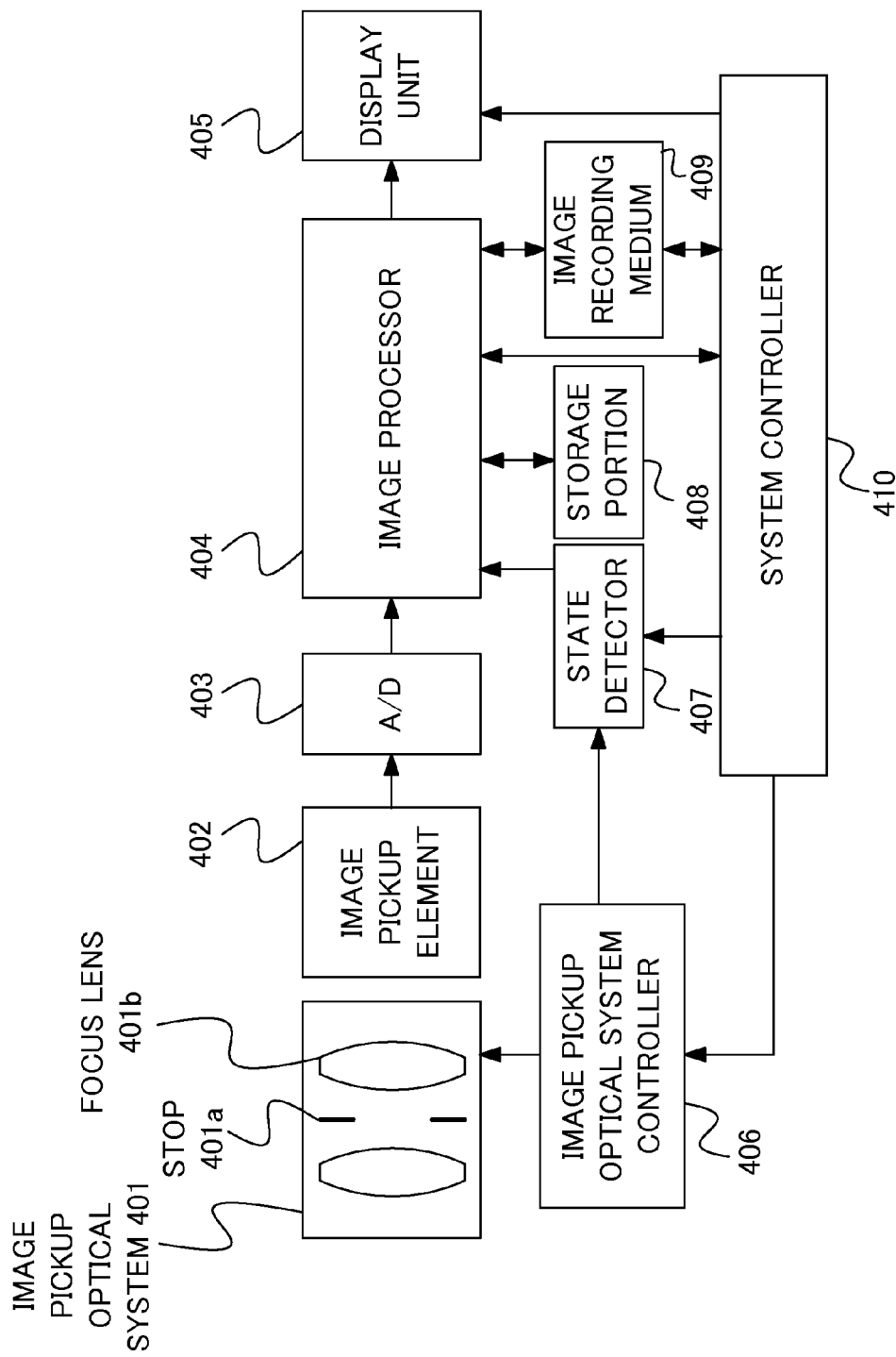
FIG. 12 is a configuration diagram of an image pickup apparatus including an image processing apparatus in Embodiment 2.

Next, referring to FIG. 12, Embodiment 2 of the present invention will be described. FIG. 12 is a configuration diagram of an image pickup apparatus in the present embodiment. In Embodiment 1, the image processing apparatus is used by installing a program which is configured so that an apparatus different from the image pickup apparatus (for example, a computer) executes the image processing method, and on the other hand in the present embodiment, the image processing apparatus is included in the image pickup apparatus.

An image pickup optical system 401 (a lens) including a stop 401a and a focus lens 401b are interchangeably attached to an image pickup apparatus 400. However, the present embodiment is not limited to this, and can also be applied to an image pickup apparatus where the image pickup optical system is integrated. An object image obtained via the image pickup optical system 401 is converted into an analog signal by a photoelectric conversion performed by an image pickup element 402, and then the analog signal is converted into a digital signal by an A/D converter 403. An image processor 404 performs a predetermined image processing for the digital signal using each of information of a state detector 407 and a storage portion 408. A system controller 410 controls each of the image processor 404, a display unit 405, an image pickup optical system controller 406, the state detector 407, and an image recording medium 409. The image pickup optical system controller 406 controls the operation of the image pickup optical system 401, and the state detector 407 detects the state of the image pickup optical system 401 based on the information of the image pickup optical system controller 406.

The image processor 404 includes the image processing apparatus in the present embodiment, and has a function that reconstructs the optical transfer function (OTF) of the image pickup optical system 401 to correct the object image. The storage portion 408 stores the information relating to the coefficient (the coefficient data), the tap number, the lens ID, the imaging condition, and the Nyquist frequency for making the reconstruction OTF calculated by the coefficient calculating apparatus. The image processing apparatus 404 matches the information obtained from the image pickup optical system 401 and the image pickup element 402 to the information stored in the storage portion 408 to read the information required for making the image restoration filter to make the image restoration filter. The image processor 404 also corrects the object image recorded in the image recording medium 409 using the generated image restoration filter. The corrected object image is displayed on the display unit 405. The details of the image processing method in the present embodiment are omitted since they are similar to Embodiment 1. According to the present embodiment, an image pickup apparatus (an image processing apparatus) that reduces an amount of storage of data required for reconstructing an optical transfer function of an image pickup optical system can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-216320, filed on Sep. 28, 2010, which is hereby incorporated by reference herein in its entirety.

What is claimed is:
1. An image processing apparatus comprising:
   a data storing portion configured to store coefficient data for reconstructing an optical transfer function of an image pickup optical system in accordance with a type of the image pickup optical system, an imaging condition, and a tap number of the optical transfer function; and a reconstruction portion configured to reconstruct the optical transfer function in accordance with Nyquist frequency of an image pickup element, the tap number, and the coefficient data, in a frequency space.

2. The image processing apparatus according to claim 1, wherein the tap number of the optical transfer function is determined in accordance with a size of a point-spread function of each image height.

3. The image processing apparatus according to claim 1, further comprising a coefficient calculating portion configured to perform a fitting processing for the optical transfer function by using a predetermined function to calculate the coefficient data.

4. The image processing apparatus according to claim 3, wherein the predetermined function is a polynomial function.

5. The image processing apparatus according to claim 3,
wherein the coefficient calculating portion is configured to perform the fitting processing for an area where the optical transfer function has a symmetry for each of a real part and an imaginary part, and
wherein the reconstruction portion is configured to reconstruct the optical transfer function of a portion of a whole defined area using the symmetry of the optical transfer function.

6. The image processing apparatus according to claim 3, further comprising an order determining portion configured to determine an order of the coefficient data in accordance with an accuracy of the fitting processing,
wherein the predetermined function is an orthogonal function.

7. The image processing apparatus according to claim 6, wherein the orthogonal function is an orthogonal polynomial function.

8. The image processing apparatus according to claim 3, wherein the coefficient data is a coefficient of the predetermined function.

9. The image processing apparatus according to claim 1,
wherein the reconstruction portion is configured to select the coefficient data based on an ID number that specifies the image pickup optical system and the imaging condition obtained from an image pickup apparatus including the image pickup element.

10. The image processing apparatus according to claim 1, further comprising a filter processing portion configured to make an image restoration filter for correcting an object image based on the reconstructed optical transfer function to perform a filter processing for the object image on a real space by using the image restoration filter.

11. The image processing apparatus according to claim 1, wherein the coefficient data is a coefficient of a polynomial function.

12. An image pickup apparatus comprising:
an image pickup element;
a data storing portion configured to store coefficient data for reconstructing an optical transfer function of an image pickup optical system in accordance with a type of the image pickup optical system, an imaging condition, and a tap number of the optical transfer function; and
a reconstruction portion configured to reconstruct the optical transfer function in accordance with Nyquist frequency of the image pickup element, the tap number, and the coefficient data, in a frequency space.

13. An image processing method performed by an image processing apparatus and comprising the steps of:
selecting coefficient data for reconstructing an optical transfer function of an image pickup optical system in accordance with a type of the image pickup optical system and an imaging condition;
acquiring a tap number of the optical transfer function;
reconstructing the optical transfer function in accordance with Nyquist frequency of an image pickup element, the tap number, and the coefficient data, in a frequency space;
making an image restoration filter for correcting an object image based on the reconstructed optical transfer function; and
performing a filter processing for the object image on a real space by using the image restoration filter.

14. A non-transitory computer-readable recording medium storing a program executable at least by a computer of an information processing apparatus, the program comprising:
selecting instructions configured to select coefficient data for reconstructing an optical transfer function of an image pickup optical system in accordance with a type of the image pickup optical system and an imaging condition;
acquiring instructions configured to acquire a tap number of the optical transfer function;
reconstructing instructions configured to reconstruct the optical transfer function in accordance with Nyquist frequency of an image pickup element, the tap number and the coefficient data, in a frequency space;
making instructions configured to make an image restoration filter for correcting an object image based on the reconstructed optical transfer function; and
performing instructions configured to perform a filter processing for the object image on a real space by using the image restoration filter.

15. An image processing apparatus that corrects an image acquired via an image pickup optical system and an image pickup element, the image processing apparatus comprising:
a reconstruction portion configured to reconstruct an optical transfer function by using coefficient data made by approximating each of a real part and an imaginary part of an optical transfer function of the image pickup optical system to a predetermined function; and
an image restoration processing portion configured to correct the image by using the reconstructed optical transfer function.

16. The image processing apparatus according to claim 15, wherein the reconstruction portion acquires the coefficient data in accordance with a type of the image pickup optical system and an imaging condition.

17. The image processing apparatus according to claim 15, wherein the reconstruction portion reconstructs the optical transfer function by using a sampling frequency of the image pickup element.

18. The image processing apparatus according to claim 15, wherein the image restoration processing portion corrects the image by using an image restoration filter generated using the reconstructed optical transfer function.

19. The image processing apparatus according to claim 18, wherein a tap number of the image restoration filter depends on a size of a point-spread function of the image pickup optical system.

20. The image processing apparatus according to claim 18, wherein a tap number of the image restoration filter depends on a pixel pitch of the image pickup element.

21. The image processing apparatus according to claim 18, further comprising a tap number determining portion configured to determine a tap number of the image restoration filter.

22. The image processing apparatus according to claim 15, further comprising a coefficient calculating portion configured to perform a fitting processing for the optical transfer function by using a predetermined function to calculate the coefficient data.

23. An image pickup apparatus comprising:
an image pickup element configured to pick-up an object image via an image pickup optical system;
a reconstruction portion configured to reconstruct an optical transfer function by using coefficient data made by approximating each of a real part and an imaginary part of an optical transfer function of the image pickup optical system to a predetermined function; and
an image restoration processing portion configured to correct the image by using the reconstructed optical transfer function.

24. An image processing method performed by an image processing apparatus and that corrects an image acquired via an image pickup optical system and an image pickup element, the image processing method comprising the steps of:
reconstructing an optical transfer function by using coefficient data made by approximating each of a real part and an imaginary part of an optical transfer function of the image pickup optical system to a predetermined function; and
correcting the image by using the reconstructed optical transfer function.

25. A non-transitory computer-readable recording medium storing a program executable at least by a computer of an information processing apparatus to cause the information processing apparatus to correct an image acquired via an image pickup optical system and an image pickup element, the program comprising:
reconstructing instructions configured to reconstruct an optical transfer function by using coefficient data made by approximating each of a real part and an imaginary part of an optical transfer function of the image pickup optical system to a predetermined function; and
correcting instructions configured to correct the image by using the reconstructed optical transfer function.

* * * * *